Patented June 4, 1929.

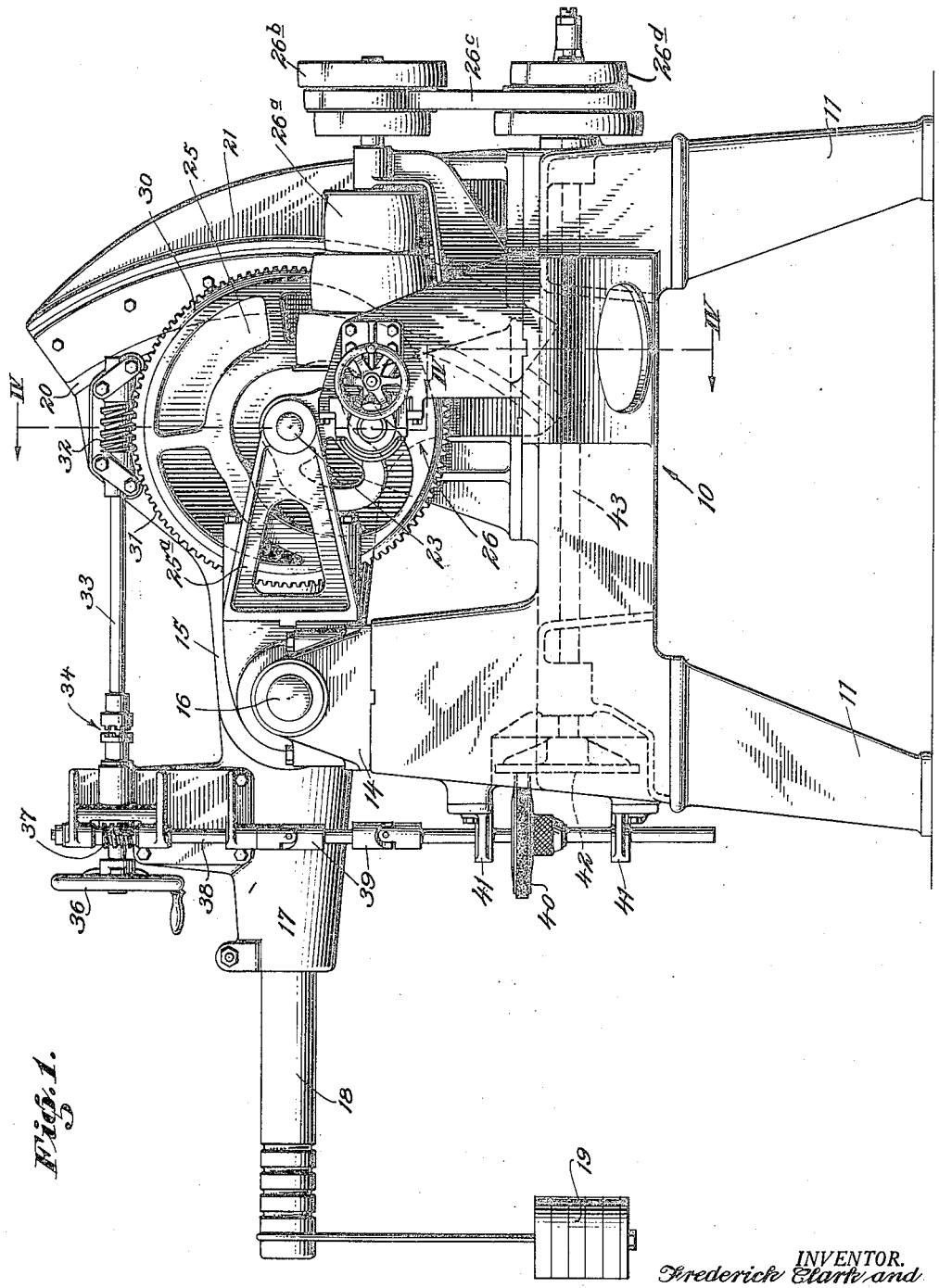

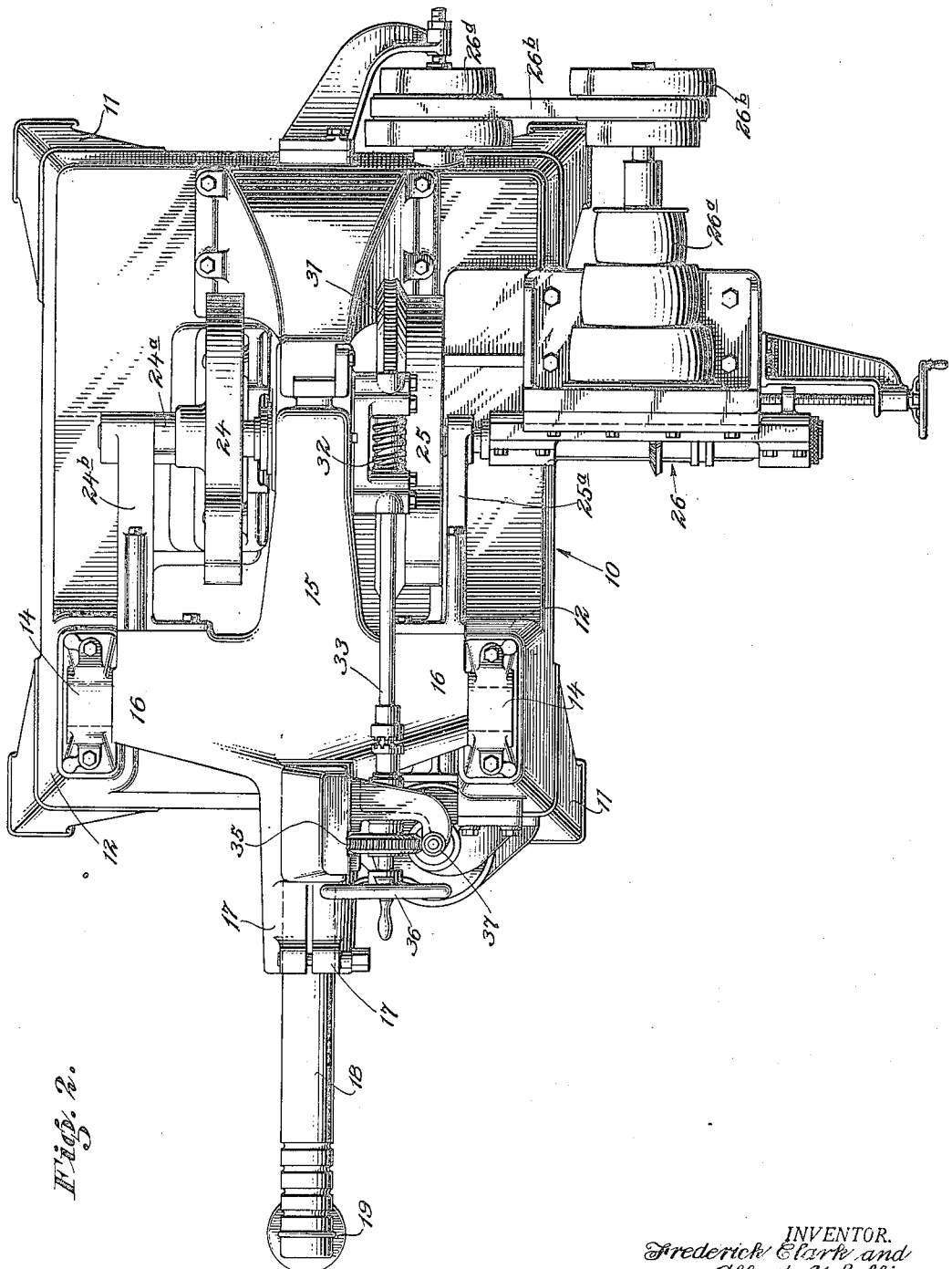

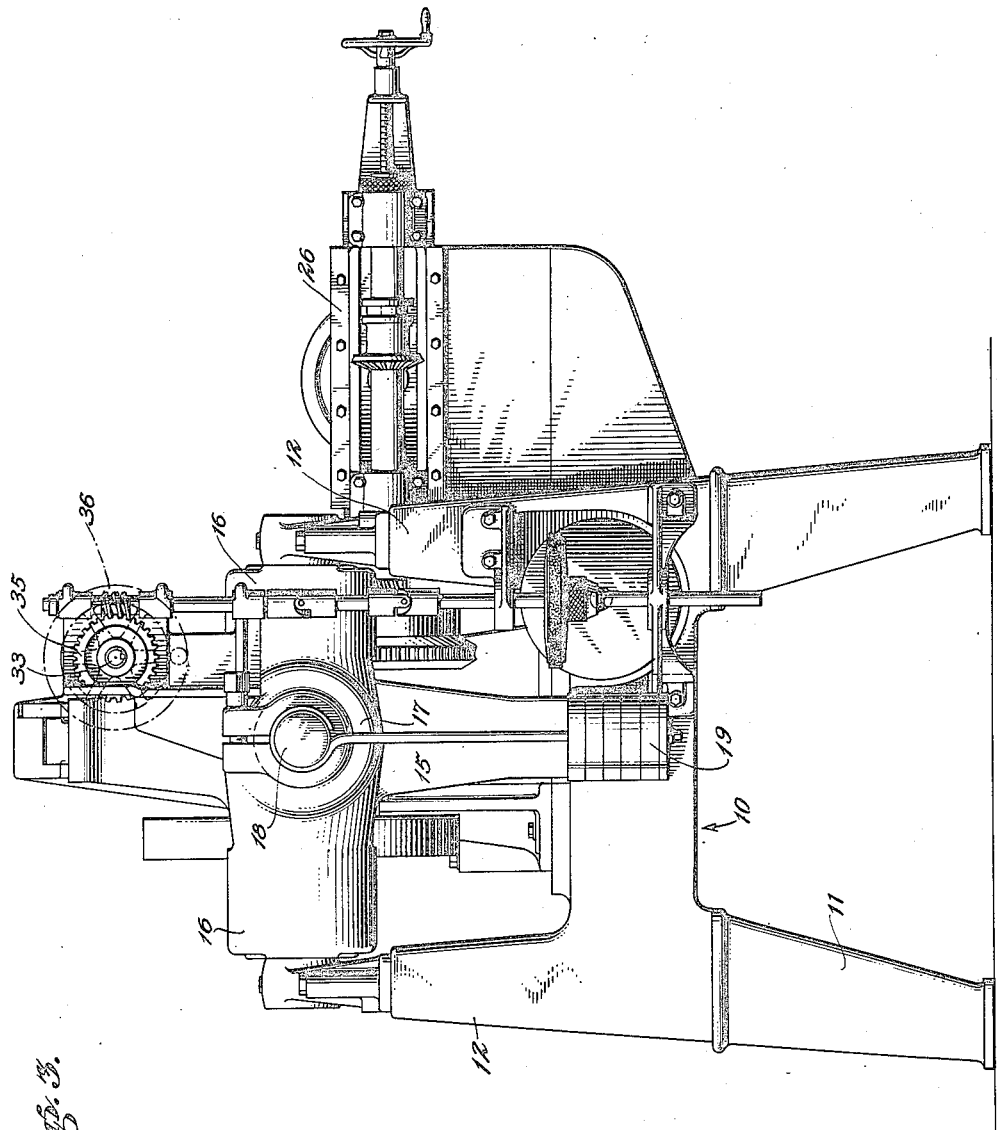

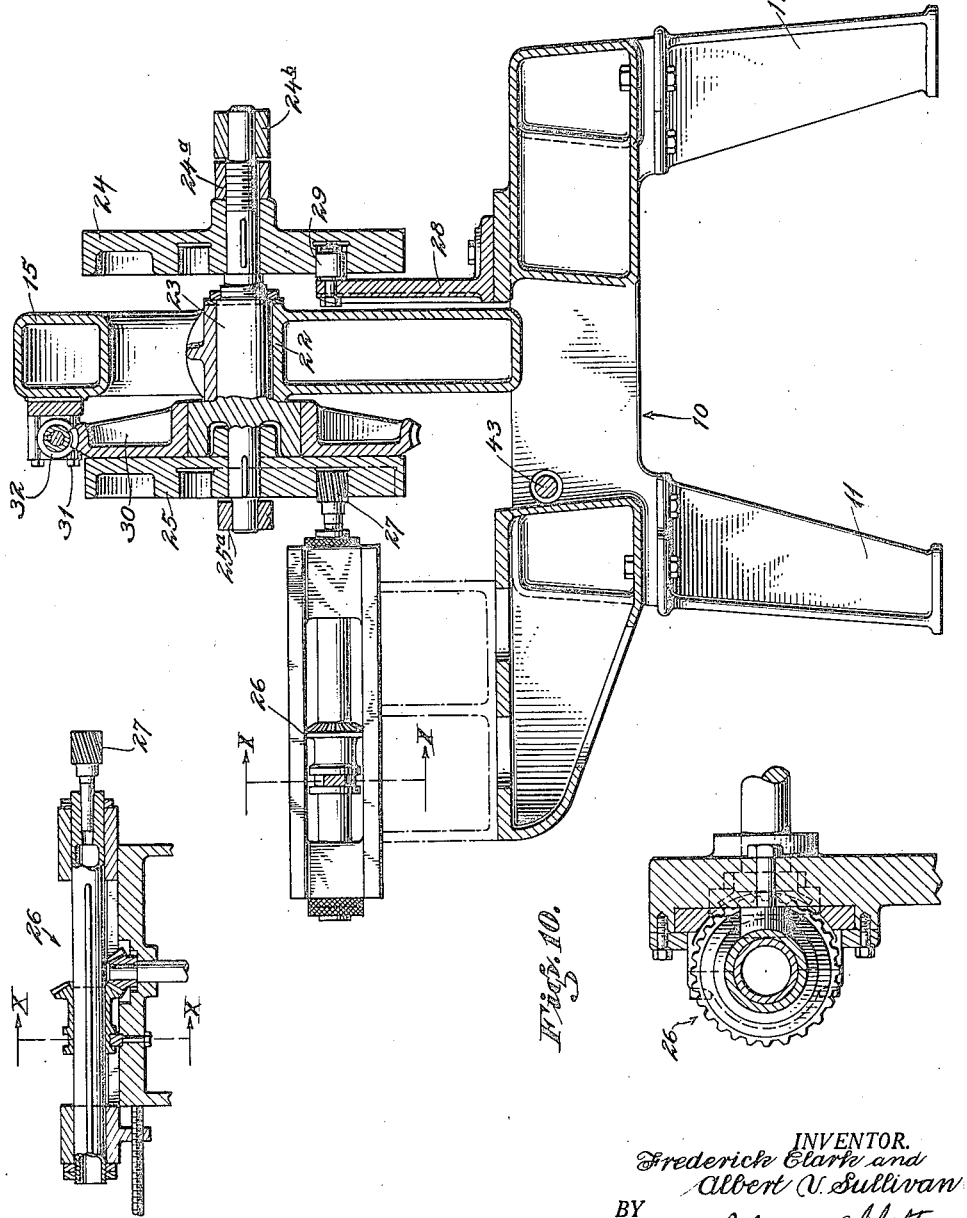

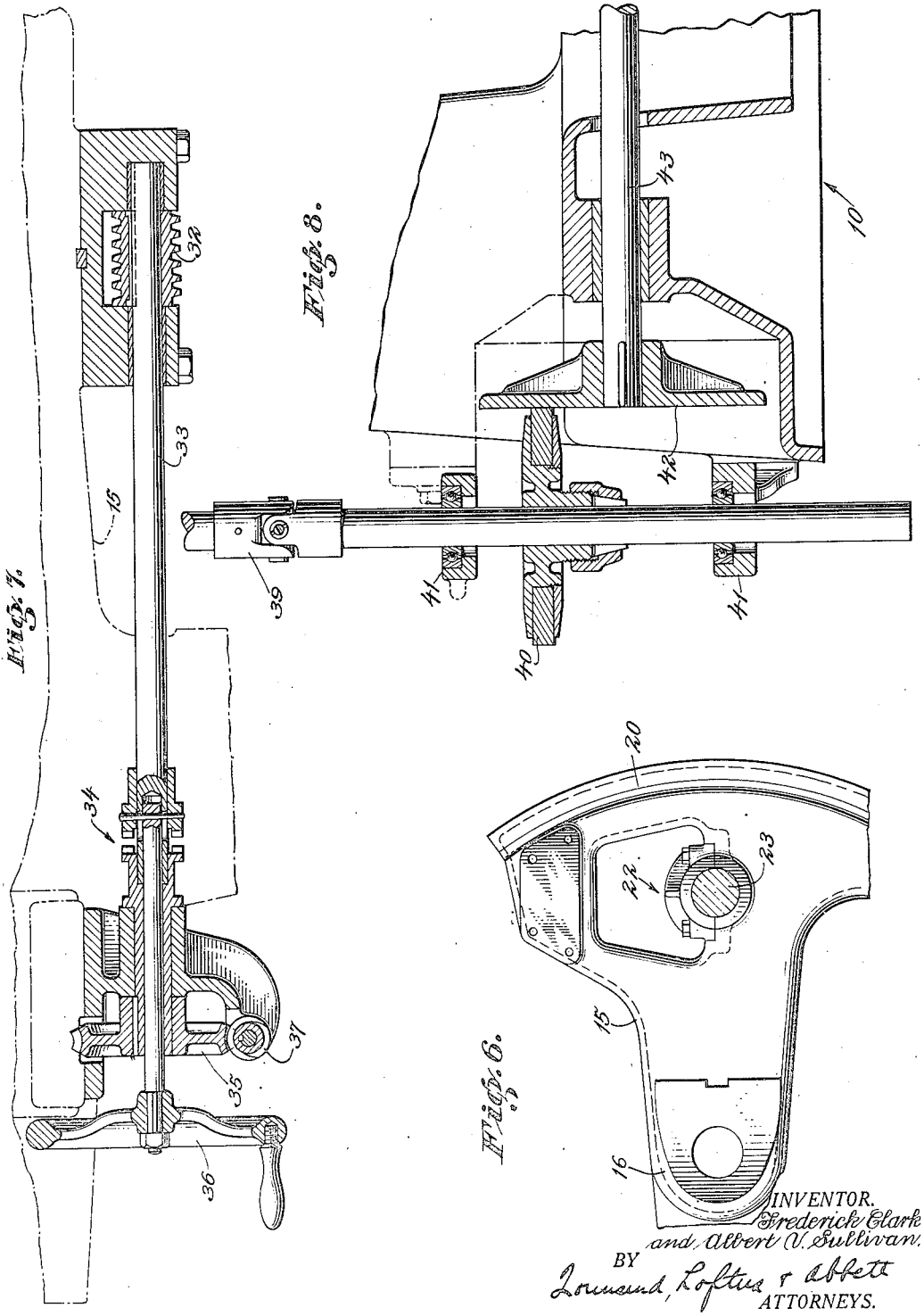

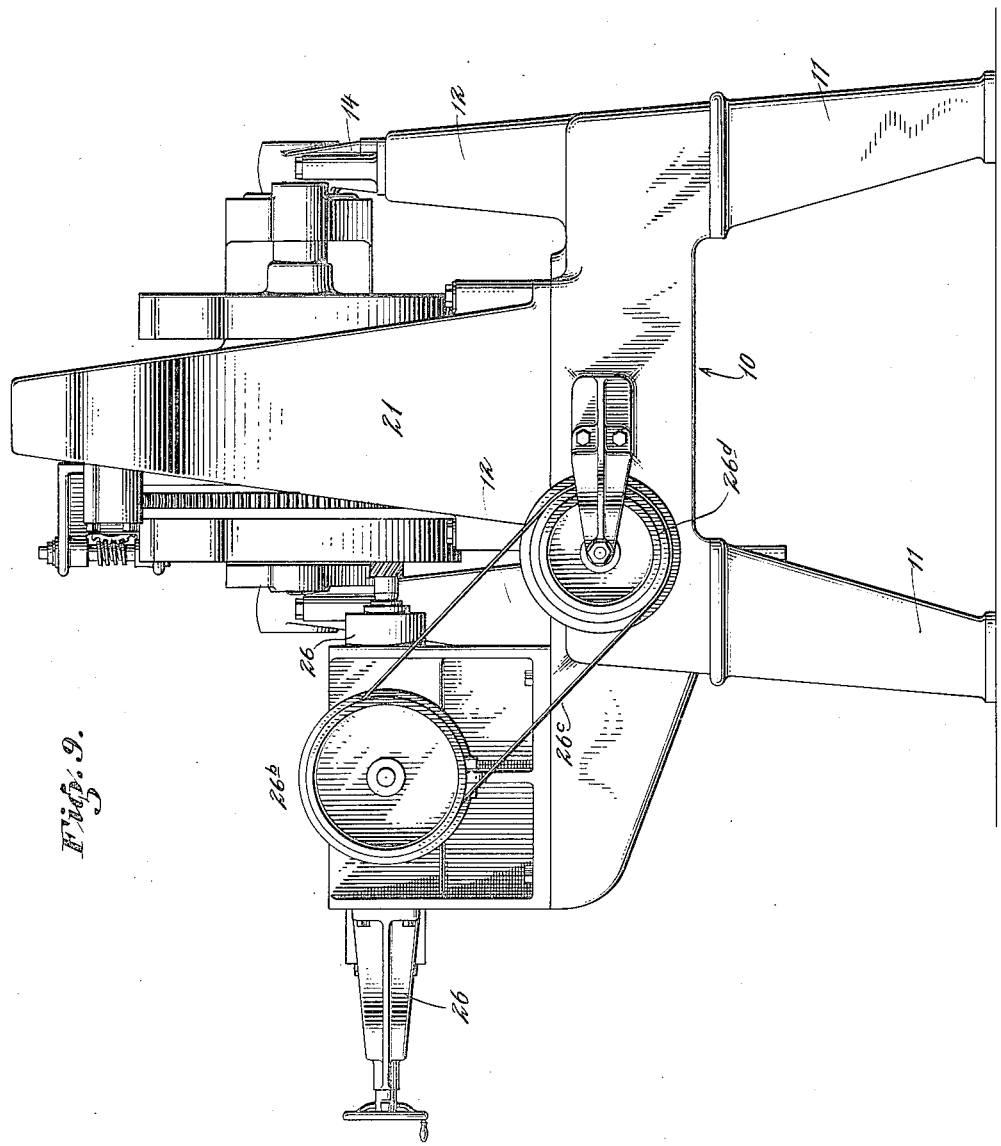

1,716,115

UNITED STATES PATENT OFFICE.

FREDERICK CLARK AND ALBERT V. SULLIVAN, OF ALAMEDA, CALIFORNIA.

CAM-MILLING MACHINE.

Application filed April 18, 1927. Serial No. 184,555.

This invention relates to machine tools and particularly pertains to a cam milling machine.

It is the principal object of the present invention to generally improve machines of the character referred to whereby to provide a cam milling machine capable of accurately and efficiently reproducing box cams, which machine is so designed that the feed of the milling cutter along the cam groove being milled will be constant regardless of the contour of the groove or its eccentricity relative to the center of the disk.

In carrying this object into practice we provide a balanced pivotal frame carrying a spindle upon which the master cam and cam to be cut are mounted. A fixed guide roller is provided engaging the master cam which guide roller is in alignment with the milling cutter, the position of which is always the same. As the spindle carrying the cams revolves the stationary guide roller engaging the master cam causes the pivotal frame to move about its pivotal point so that the milling cuttter will mill in a path exactly the same as that traversed by the guide roller. This movement of the pivotal frame automatically governs the speed of the spindle carrying the cams so that the groove being cut will be fed passed the milling cutter at a constant rate of speed regardless of the shape of the cam groove or its eccentricity relative to the center of the disk.

One form which the invention may assume is exemplified in the followed description and illustrated by way of example in the accompanying drawings, in which:

Fig. 1 is a side elevation of a cam milling machine embodying the preferred form of our invention.

Fig. 2 is a plan view of the machine.

Fig. 3 is an end elevation of the machine.

Fig. 4 is a central vertical section through the machine taken on line IV—IV of Fig. 1.

Fig. 5 is a fragmentary view in section through one portion of the milling unit.

Fig. 6 is an enlarged detailed view of the pivotal frame.

Fig. 7 is an enlarged fragmentary view of a portion of the spindle drive mechanism with portions in section to more fully disclose their construction.

Fig. 8 is an enlarged fragmentary view showing the frictional drive of the spindle.

Fig. 9 is an end elevation of the machine showing the general arrangement of the parts.

Fig. 10 is a section taken on line $x$—$x$, Figs. 4 and 5.

Referring more particularly to the accompanying drawings, 10 indicates a horizontally disposed bed plate of suitable design which is fitted with supporting legs 11. At one end of this bed plate up-raised platforms 12 are formed which are located one at each side of the bed plate. Bearings 14 are bolted or otherwise secured at the upper ends of these platforms 12.

Disposed between the bearings 14 is a pivotal frame 15 which is fitted with horizontally disposed and outwardly projecting trunnions 16 rotatably received in the bearings 14. This connection between the pivotal frame 15 and the bed plate permits the frame 15 to oscillate in a vertical plane relative to the bed plate. The trunnions 16 project from the sides of the pivotal frame 15 at a point intermediate its ends, so that one end of the pivotal frame will project over the bed plate while the other end will project outwardly beyond the bed plate. At this latter end the pivotal frame 15 is formed with a horizontal socket 17 extending inwardly from its ends. This socket receives one end of a stub shaft 18 which is in alignment with the pivotal frame and projects outwardly therefrom. The socket 17 is split so that the stub shaft 18 may be firmly clamped therein. A counterweight 19 is suspended from the outer end of the stub shaft 18 to counterbalance the mechanism supported by the other end of the pivotal frame 15, it being intended to balance the pivotal frame 15 about its pivotal point as closely as possible. This permits the pivotal frame 15 to oscillate about its trunions 16 with a minimum of effort.

At the end of the pivotal frame 15 which overlies the bed plate 10 it is formed with an arcuate guide shoe 20 slidably disposed within an arcuate guide 21 secured on the bed plate 10. The sliding connection between the pivotal frame 15 and the guide 21 keeps the frame 15 in vertical alignment so that it will oscillate in a true vertical path.

Contiguous to the segmental end of the pivotal frame 15 it is formed with a central bearing 22 which receives a spindle 23. This spindle is horizontally disposed and rotatably mounted in the bearing 22 and its ends project outwardly beyond the sides of the pivotal frame 15.

At one side of the frame a face plate 30 is guided onto the spindle 23 and against which a cam disk 25 to be milled may be arranged. In arranging this cam disk 25 on the spindle, it is keyed thereto and an out bored bearing 25ª is then arranged at the end of the spindle. This out bored bearing 25ª is bolted to the pivotal frame 15 as disclosed in the drawings. At this side of the machine a milling unit 26 is mounted. The particular construction of this milling unit is of no importance in the present application as it forms no part of the present invention.

It will suffice to say that this milling machine is capable of driving a milling cutter 27 at a suitable rate of speed to mill the groove in a box cam. The position of the milling cutter 27 remains constant.

To drive the milling cutter, the milling unit 26 is fitted with a cone 26ª over which a driving belt is led. Secured on the shaft of this cone 26ª is a second cone 26ᵇ which is connected by a belt 26ᶜ to a cone 26ᵈ. This cone 26ᵈ is secured on a drive shaft 43 of the machine which is suitably journalled in the bed plate 10.

At the side of the machine opposite the milling unit the spindle 23 is adapted to receive a master cam 24. This cam may be keyed on the spindle and may be secured in place thereon by a nut 24ª threaded on the spindle. An out bored bearing 24ᵇ is also arranged at this end of the spindle after the master cam has been positioned.

Contiguous to the master cam is a vertically extending bracket 28 rigidly secured to the bed plate 10. The upper end of this bracket 28 carries a cam roller 29 engaging the groove in the master cam. The position of this cam roller 29 is constant and it is in axial alignment with the milling cutter 27. It being intended that as the spindle 23 is revolved, the cam groove in the master cam 24 will ride on the stationary cam roller 29 and cause the frame 15 to vertically oscillate to an extent permitting the milling cutter 27 to mill a path through the cam disk 25 being cut exactly the same as the groove in the master cam.

It is our intention that the cam 25 which is being cut be fed to the milling cutter at a constant rate of speed regardless of the radial position of the cutter relative to the center of the cam disk. This is very important and is accomplished by means of a frictional drive between the drive shaft 43 and the spindle 23. This drive is so arranged that the speed at which the cam being cut revolves is automatically adjusted so that the feed of the milling cutter at any radial point thereon will be constant.

To accomplish this drive, the periphery of the face plate 30 is formed with a worm gear 31 which is in mesh with a worm 32. This worm 32 is keyed on a horizontally disposed shaft 33 suitably journalled at one side of the pivotal frame 15. The shaft 33 is formed in two aligned parts between which a clutch mechanism 34 is interposed. The worm 32 is mounted on one of these parts and at one end of the shaft, while a worm wheel 35 is secured on the other part of the shaft and at the opposite end thereof. It is intended that a driving connection be formed between these two elements by means of the clutch 34. This element is capable of operation by a hand wheel 36 to either form a driving connection between the worm 32 and the worm wheel 35 or to interrupt the drive therebetween. Likewise, the hand wheel may be manually rotated to impart rotation to the face plate and the cam wheel thereon for setting up purposes.

The worm gear 35 is in constant mesh with a worm 37 keyed or otherwise secured on a vertically disposed shaft 38. This shaft is fitted in suitable bearings at its upper end on the pivotal frame 15 and is collared to prevent axial movement with relation to these bearings. At its lower end the shaft is rotatably and slidably received in bearings 41 carried by the bed plate 10. This mounting of the shaft 38 permits vertical oscillation of the frame without interrupting the drive of the shaft 38. To permit the shaft to bend when the pivotal frame 15 oscillates a pair of universal connections 39 are interposed in the shaft. It is seen that by this construction when the pivotal frame 15 oscillates, the shaft 38 will reciprocate vertically with relation to the bed plate 10, this vertical reciprocation being permitted due to the fact that the shaft is rotatably and slidably received in the bearings 41 on the bed plate.

Intermediate the bearings 41 a friction disk 40 is adjustably secured on the shaft 38 and lies in a horizontal plane in frictional engagement with a friction driving disk 42 which lies in a plane at right angles to the disk 40 and is keyed on the drive shaft 43. Due to the frictional engagement between the disks 40 and 42, the drive transmitted to the drive shaft 43 will be transmitted to the shaft 38 and thence to the spindle 23 through the medium of the worm and gears.

As before stated it is intended that the speed of the spindle 23 be automatically controlled so that the cam groove being milled will be fed to the cutter at a constant rate of speed regardless of its irregular contour and its eccentricity relative to the center of the cam disk.

The drive shaft is driven at a constant speed and drives the shaft 38 as stated through the medium of the friction wheels 40 and 42. As the shaft 38 is collared to the pivotal frame beyond the latter's pivotal point and is reciprocable relative to the main frame 10 and the friction wheel 42, when the spindle 23 is raised moving the cutter outwardly from the center of the cam disk, the friction wheel 40 will move toward the center of the friction drive disk 42. This will, of course, reduce the speed of the shaft 38 and consequently the speed at which the cam disk being milled revolves. Similarly when the spindle 23 is lowered as the cam groove in the cam being milled approaches the center of the cam disk, the shaft 38 will be elevated and shift the wheel 40 toward the outer periphery of the friction disk 42, increasing the speed at which the cam disk revolves. The ratios have been so worked out that the cam groove being milled is fed to the cutter at a constant rate of speed regardless of the cam groove's irregular contour and the amount of its eccentricity relative to the center of the cam disk being milled.

In operation of the device, the machine is constructed and assembled as shown in the drawings and a counterweight is fitted to the end of the stub shaft 18 so as to balance the pivotal frame 15 as nearly as possible about its pivotal point. This is quite important as it permits smoothness in operation. A master cam is then placed on the spindle 23 and clamped in position thereon by the nut 24ª. The out bored bearing 24ᵇ is then applied and securely bolted to the pivotal frame 15. At the other side of the frame a cam disk to be milled is keyed on the spindle 23 and placed against the face plate 30. The out bored bearing 25ª is then assembled on the pivotal frame 15 to support the other outer end of the spindle. As both the master cam and the cam disk to be milled are keyed on the spindle, they will be at all times held in proper alignment.

When mounting the master cam on the spindle 23, the guide roller 29 is projected within the finished groove in the master cam so that the contour of the cam groove in the master cam will control the movement of the pivotal frame 15. As the pivotal frame is counterweighted and balanced about its pivotal point, there will be no excess strain placed on this cam roller and it will act merely to guide the frame in its vertical oscillation in properly manipulating the pivotal frame to cause the milling cutter 27 to accurately reproduce the cam groove in the master cam in the cam being milled.

As before stated the milling cutter 27 is held in a stationary position and in the present instance is exactly in alignment with the roller 29.

The drive transmitted to the cone 26ª on the milling unit will be transmitted through the cone 26ᵇ and belt 26ᶜ to the cone 26ᵈ on the drive shaft 43. This will drive the drive shaft at a constant rate of speed. The drive imparted to the drive shaft 43 will be transmitted to the spindle 23 through the friction wheels 40 and 42, the shaft 38 and the driving mechanism intermediate the shaft 38 and the gear 31 on the face plate 30. The latter of which is keyed or otherwise secured to the spindle 23.

As the cam groove moves toward or away from the center of the cam disk, the pivotal frame 15 will be oscillated vertically and the speed of the cam disk will be automatically governed so that the cam will be fed to the milling cutter at a constant speed regardless of its position relative to the center of the cam disk.

This is accomplished by the friction disk 40 being moved toward and away from the center of the friction disk 42 when the pivotal frame 15 oscillates. As the cam groove approaches the periphery of the cam, the disk 40 approaches the center of the driving disk 42 and consequently reduces the speed of the spindle 23, and as the cam groove approaches the center of the disk, the disk 40 travels toward the outer periphery of the driving friction disk 42 and consequently increases the speed at which the spindle carrying the cam revolves. Therefore, it is obvious that regardless of the contour of the cam groove and its eccentricity relative to the center of the disk, the speed at which the milling cutter passes along the groove is automatically controlled so that it will be constant.

As the pivotal frame 15 is balanced about its pivotal point, it will be very sensitive permitting the cam being milled to be an exact reproduction of the master cam and its groove will be smooth and regular.

While we have shown the preferred form of our invention, it is to be understood that various changes may be made in its construction by those skilled in the art without departing from the spirit of the invention, as defined in the appended claims.

Having thus described our invention, what we claim and desire to secure by Letters Patent is:

1. A cam milling machine comprising a pivotal frame carrying a spindle adapted to receive a master cam and a cam to be milled, said pivotal frame being adapted to oscillate relative to a fixed milling cutter, guiding means engageable with the master cam for actuating the pivotal frame so that the milling cutter will reproduce the groove of the master cam in the cam to be milled, and automatically governed means for revolving the spindle at a variable rate of speed determined by the position of the cutter relative to the spindle, said pivotal frame being balanced about its pivotal point.

2. A cam milling machine comprising a bed plate, a pivotal frame mounted thereon and adapted to oscillate, a spindle carried by the frame and adapted to receive a master cam and a cam to be milled, a milling cutter stationarily positioned and adapted to engage the cam to be cut, means on the bed plate engageable with the master cam to move the spindle relative to the cutter so that the latter will reproduce the groove of the master cam in the cam being cut, said pivotal frame being balanced about its pivotal point.

3. A cam milling machine comprising a bed plate, a pivotal frame mounted thereon and adapted to oscillate, a spindle carried by the frame and adapted to receive a master cam and a cam to be milled, a milling cutter stationarily positioned and adapted to engage the cam to be cut, means on the bed plate engageable with the master cam to move the spindle relative to the cutter so that the latter will reproduce the groove of the master cam in the cam being cut, automatically governed means for revolving the spindle at a variable rate of speed determined by the position of the cutter relative to the spindle, said pivotal frame being balanced about its pivotal point.

4. A cam milling machine comprising a bed plate, a pivotal frame mounted thereon and adaped to oscillate, a spindle carried by the frame and adapted to receive a master cam and a cam to be milled, a milling cutter stationarily positioned and adapted to engage the cam to be cut, means on the bed plate engageable with the master cam to move the spindle relative to the cutter so that the latter will reproduce the groove of the master cam in the cam being cut, a guide member on the bed plate to guide the frame in its oscillating movement, said frame being balanced about its pivotal point, means for revolving the spindle, and means for governing the speed of the spindle whereby its peripheral speed at the point of the cutter will be constant.

5. A cam milling machine comprising a bed plate, a pivotal frame mounted thereon and adapted to oscillate vertically, a spindle extending transversely through the frame and adapted to receive a master cam and a cam to be cut, said frame being balanced about its pivotal point, a milling cutter carried by the bed plate and adapted to be positioned in operative relation to the cam to be cut, means carried by the bed plate and engageable with the master cam for moving the cam to be cut relative to the cutter whereby the cutter will reproduce the groove of the master cam, automatically governed means for revolving the spindle at a variable rate of speed determined by the position of the cutter relative to the spindle, said means including a friction transmission automatically shifted by movement of the pivotal frame.

FREDERICK CLARK.
ALBERT V. SULLIVAN.